United States Patent
Refaat et al.

(10) Patent No.: US 11,851,081 B2
(45) Date of Patent: Dec. 26, 2023

(54) PREDICTABILITY-BASED AUTONOMOUS VEHICLE TRAJECTORY ASSESSMENTS

(71) Applicant: Waymo LLC, Mountain View, CA (US)

(72) Inventors: Khaled Refaat, Mountain View, CA (US); Haoyu Chen, Sunnyvale, CA (US); Wei Chai, Cupertino, CA (US); Alisha Saxena, Bellevue, WA (US)

(73) Assignee: Waymo LLC, Mountain View, CA (US)

( * ) Notice: Subject to any disclaimer, the term of this patent is extended or adjusted under 35 U.S.C. 154(b) by 427 days.

(21) Appl. No.: 17/108,626

(22) Filed: Dec. 1, 2020

(65) Prior Publication Data
US 2022/0169278 A1    Jun. 2, 2022

(51) Int. Cl.
| | | |
|---|---|---|
| *B60W 60/00* | (2020.01) | |
| *G06K 9/62* | (2022.01) | |
| *G06K 9/00* | (2022.01) | |
| *G06N 3/08* | (2023.01) | |
| *G06V 20/56* | (2022.01) | |
| *G06F 18/214* | (2023.01) | |
| *G06F 18/2415* | (2023.01) | |

(52) U.S. Cl.
CPC ......... *B60W 60/001* (2020.02); *G06F 18/214* (2023.01); *G06F 18/2415* (2023.01); *G06N 3/08* (2013.01); *G06V 20/56* (2022.01)

(58) Field of Classification Search
CPC ........... B60W 60/001; B60W 2556/10; B60W 2556/20; B60W 60/0011; G06V 20/56; G06F 18/214; G06F 18/2415; G06N 3/08; G06N 3/045; G06N 3/044
See application file for complete search history.

(56) References Cited

U.S. PATENT DOCUMENTS

| | | |
|---|---|---|
| 9,120,484 B1 | 9/2015 | Ferguson et al. |
| 9,457,807 B2 | 10/2016 | Lee et al. |
| 9,766,626 B1 | 9/2017 | Zhu et al. |
| 9,989,964 B2 | 6/2018 | Berntorp et al. |

(Continued)

OTHER PUBLICATIONS

Mathworld.wolfram.com [online], "Legendre Polynomial," Last updated Nov. 2019, 2020, retrieved on Dec. 10, 2020, retrieved from URL<https://mathworld.wolfram.com/LegendrePolynomial.html>, 5 pages.

(Continued)

*Primary Examiner* — Rachid Bendidi
*Assistant Examiner* — Sahar Motazedi
(74) *Attorney, Agent, or Firm* — Fish & Richardson P.C.

(57) ABSTRACT

Data representing a set of predicted trajectories and a planned trajectory for an autonomous vehicle is obtained. A predictability score for the planned trajectory can be determined based on a comparison of the planned trajectory to the set of predicted trajectories for the autonomous vehicle. The predictability score indicates a level of predictability of the planned trajectory. A determination can be made, based at least on the predictability score, whether to initiate travel with the autonomous vehicle along the planned trajectory. In response to determining to initiate travel with the autonomous vehicle along the planned trajectory, a control system can be directed to maneuver the autonomous vehicle along the planned trajectory.

17 Claims, 6 Drawing Sheets

(56) References Cited

U.S. PATENT DOCUMENTS

| | | |
|---|---|---|
| 10,059,334 B1 | 8/2018 | Zhu et al. |
| 10,345,815 B2 | 7/2019 | Lv et al. |
| 10,421,453 B1 | 9/2019 | Ferguson |
| 10,782,694 B2 | 9/2020 | Zhang et al. |
| 11,541,909 B1* | 1/2023 | Poubel Orenstein ........................ B60W 60/0013 |
| 2017/0031361 A1 | 2/2017 | Olson et al. |
| 2018/0059670 A1 | 3/2018 | Nilsson et al. |
| 2019/0049970 A1 | 2/2019 | Djuric et al. |
| 2019/0072965 A1 | 3/2019 | Zhang et al. |
| 2019/0113927 A1 | 4/2019 | England |
| 2019/0204842 A1 | 7/2019 | Tafti et al. |
| 2019/0266516 A1 | 8/2019 | Olabiyi |
| 2019/0369637 A1 | 12/2019 | Shalev-Shwartz et al. |
| 2019/0384994 A1 | 12/2019 | Frossard et al. |
| 2020/0082248 A1 | 3/2020 | Villegas et al. |
| 2020/0086861 A1 | 3/2020 | McGill et al. |
| 2020/0174490 A1 | 6/2020 | Ogale et al. |
| 2022/0063666 A1* | 3/2022 | Beijbom ................ G06V 10/82 |

OTHER PUBLICATIONS

Zaheer et al., "Deep Sets," CoRR, Mar. 10, 2017, arxiv.org/abs/1703.06114, 29 pages.

* cited by examiner

PREDICTABILITY-BASED AUTONOMOUS VEHICLE TRAJECTORY ASSESSMENTS

BACKGROUND

Autonomous vehicles can include onboard sensors that capture information about the environment in which the vehicle operates. Additionally, computing systems onboard the vehicle are configured to process sensors signals to generate automated driving decisions. The driving decisions can pertain to a range of tasks, and the degree of automation can vary. For example, semi-autonomous vehicles can automate or assist a human operator with discrete driving tasks, while fully autonomous vehicles can be driven without human intervention at all. Autonomous vehicles can also monitor other, nearby road agents (e.g., other vehicles, pedestrians, or cyclists) so that safe and effective driving decisions are made that ensure the autonomous vehicle will avoid collisions and comply with applicable traffic laws and regulations.

Some autonomous vehicles implement machine-learning models such as artificial neural networks to aid in processing sensor signals and developing driving decisions. Neural networks are machine-learning models that employ multiple layers of operations to predict one or more outputs from one or more inputs. Neural networks typically include one or more hidden layers situated between an input layer and an output layer. The output of each layer is used as input to another layer in the network, e.g., the next hidden layer or the output layer.

Each layer of a neural network specifies one or more transformation operations to be performed on input to the layer. The transformation operations can be characterized by values of internal parameters of the neural network. Some neural network layers have operations that are referred to as neurons. Each neuron receives one or more inputs and generates an output for receipt by another neural network layer. Often, each neuron receives inputs from other neurons, and each neuron provides an output to one or more other neurons.

SUMMARY

This specification describes systems, methods, devices, and other techniques for assessing the "predictability" of candidate trajectories for an autonomous vehicle (e.g., a self-driving car). When an autonomous vehicle is driven, onboard computing systems constantly process data about the environment surrounding the vehicle. The processed data can include information about the route that vehicle is instructed to follow to reach a destination, a road graph that defines information about lane boundaries, information about traffic controls and regulations (e.g., speed limits), and information about the movements of other road agents in a vicinity of the autonomous vehicle (e.g., other vehicles, pedestrians, and cyclists). These types of data (and others) can be processed in one or more stages, which culminates in a planning subsystem generating candidate trajectories that it proposes for the vehicle to follow to progress along a route toward the destination. The candidate trajectories can define specific movements for the vehicle (e.g., by specifying target locations for the vehicle at a series of time steps), and are generally adapted to permit the vehicle to travel along a roadway in a manner that is both safe (e.g., avoids collisions), legal (e.g., complies with applicable traffic laws and regulations), and comfortable to passengers.

But another important consideration for movements of an autonomous vehicle is that they be predictable, especially to drivers of other vehicles and other road users such as pedestrians and cyclists. For example, once an autonomous vehicle has initiated a lane-change maneuver, other road users would generally expect the lane change to be completed absent an unusual but compelling reason to abort (e.g., to avoid a collision). Thus, even if the planner generates a new candidate trajectory in the midst of the lane-change maneuver that would have the autonomous vehicle return to the original lane (and abort the lane-change maneuver), it is generally preferred not to abort the maneuver mid-course and instead complete the lane change as originally planned. The autonomous vehicle will then act more similarly to human drivers, and the movements of the autonomous vehicle are more likely to be consistent with the expectations of other road users. Following more predictable trajectories can enhance safety, avoid awkward interactions with other agents, and increase the comfort and peace of mind of passengers in the autonomous vehicle itself.

The techniques described in this specification can facilitate the selection of more predictable planner trajectories in order to realize at least some of the foregoing benefits associated with predictability. Moreover, certain implementations of the disclosed techniques can achieve one or more additional advantages. For instance, the predictability of candidate trajectories from a planning subsystem can be assessed even when attributes of the trajectories that would otherwise be available from a prediction subsystem are unavailable for the planned trajectories. In some implementations, the trajectory evaluation model that generates predictability scores can assess a candidate planned trajectory against a variable number of predicted trajectories—thus accommodating the common circumstance where different numbers of predicted trajectories are available. The trajectory evaluation model can also encode a set of predicted trajectories just once, and can re-use the encoded representation of the predicted trajectories to evaluate multiple candidate planned trajectories. In this way, the computational expense and latency involved in generating predictability scores for more than one candidate planned trajectory can be reduced. Additionally, the disclosed training techniques can reduce noise in training data using smoothing techniques that allow for greater parity in the signal-to-noise ratios of both positive and negative training examples.

Some implementations of the subject matter disclosed here include methods for operating an autonomous vehicle. The methods can include actions for obtaining, from one or more first models, data representing a set of predicted trajectories for the autonomous vehicle. Data representing a planned trajectory for the autonomous vehicle can be obtained from one or more second models different from the one or more first models. A predictability score for the planned trajectory can be determined based on a comparison of the planned trajectory to the set of predicted trajectories for the autonomous vehicle. The predictability score indicates a level of predictability of the planned trajectory. A determination can be made, based at least on the predictability score, whether to initiate travel with the autonomous vehicle along the planned trajectory. In response to determining to initiate travel with the autonomous vehicle along the planned trajectory, a control system can be directed to maneuver the autonomous vehicle along the planned trajectory.

These and other implementations can, in some cases, further include one or more of the following features.

The one or more first models can include one or more behavior prediction models configured to predict movements of agents in an environment of the autonomous vehicle based on a first set of input parameters.

The one or more second models can include one or more trajectory planner models configured to plan movements of the autonomous vehicle in the environment based on a second set of input parameters. The second set of input parameters can include at least one parameter that is not within the first set of input parameters and that is not used by the behavior prediction models to predict movements of agents in the environment of the autonomous vehicle.

A resolution of the planned trajectory for the autonomous vehicle can be greater than the respective resolutions of each of the predicted trajectories in the set of predicted trajectories.

Each predicted trajectory in the set of predicted trajectories can represent a different possible trajectory that the autonomous vehicle is predicted to travel. At least two of the predicted trajectories can correspond to different actions that the autonomous vehicle is predicted to perform.

Determining the predictability score for the planned trajectory can further include processing probability scores that indicate respective probabilities of the set of predicted trajectories for the autonomous vehicle.

The planned trajectory can be a first candidate planned trajectory for the autonomous vehicle. The actions can further include obtaining, from the one or more second models, a set of candidate planned trajectories for the autonomous vehicle, where the first candidate planned trajectory is among the set of candidate planned trajectories. Respective predictability scores can be determined for each of the set of candidate planned trajectories. Determining whether to initiate travel with the autonomous vehicle along the planned trajectory can include ranking the set of candidate planned trajectories based at least on the respective predictability scores and determining to maneuver the autonomous vehicle according to a highest-ranked one of the set of candidate planned trajectories.

Determining the predictability score for the planned trajectory based on the comparison of the planned trajectory to the set of predicted trajectories for the autonomous vehicle can include processing, with a third model, the set of predicted trajectories, the planned trajectory, and a set of probability scores to generate the predictability score. The set of probability scores can indicate respective likelihoods that the autonomous vehicle will travel along different ones of the predicted trajectories. The third model can be a machine-learning model that includes a first sub-model and a second sub-model. The first sub-model can be configured to process the data representing the set of predicted trajectories for the autonomous vehicle and the set of probability scores for the predicted trajectories to generate an encoded representation of the predicted trajectories. The second sub-model can be configured to process the encoded representation of the predicted trajectories and the data representing the planned trajectory for the autonomous vehicle to generate the predictability score. In some implementations, the first sub-model can include at least one of a deep set model or a recurrent neural network, wherein the first sub-model is configured to process data representing a variable number of predicted trajectories.

The encoded representation can have a fixed size regardless of the number of predicted trajectories processed by the first sub-model.

The second sub-model can be or include a feedforward neural network having a set of fully connected processing layers.

The third model can be trained using an end-to-end process such that the first sub-model and the second sub-model are jointly trained.

Some implementations of the subject matter disclosed herein include a system having one or more computers configured to implement: a behavior prediction subsystem that generates a set of predicted trajectories for an autonomous vehicle; a planning subsystem that generates a set of candidate planned trajectories for the autonomous vehicle; a trajectory evaluation subsystem that determines respective predictability scores for the set of candidate planned trajectories, wherein determining the respective predictability score for each candidate planned trajectory includes: processing, with a predictability scoring model, (i) an encoded representation of the set of predicted trajectories and (ii) data representing the candidate planned trajectory to generate the respective predictability score, wherein the encoded representation was generated by processing, with an encoder, (i) data representing the set of predicted trajectories for the autonomous vehicle and (ii) probability scores for the set of predicted trajectories; and a control system that directs the autonomous vehicle to initiate travel along a particular one of the set of candidate planned trajectories that was selected based at least in part on the respective predictability score for the particular one of the candidate planned trajectories.

Some implementations of the subject matter disclosed herein include a system having one or more processors and one or more computer-readable media encoded with instructions that, when executed by the one or more processors, perform actions of any of the methods and processes described herein.

Additional features and advantages are described throughout the specification, and will be apparent to persons of ordinary skill in the field based on the following description, the drawings, and the claims.

DETAILED DESCRIPTION

Figure 1:
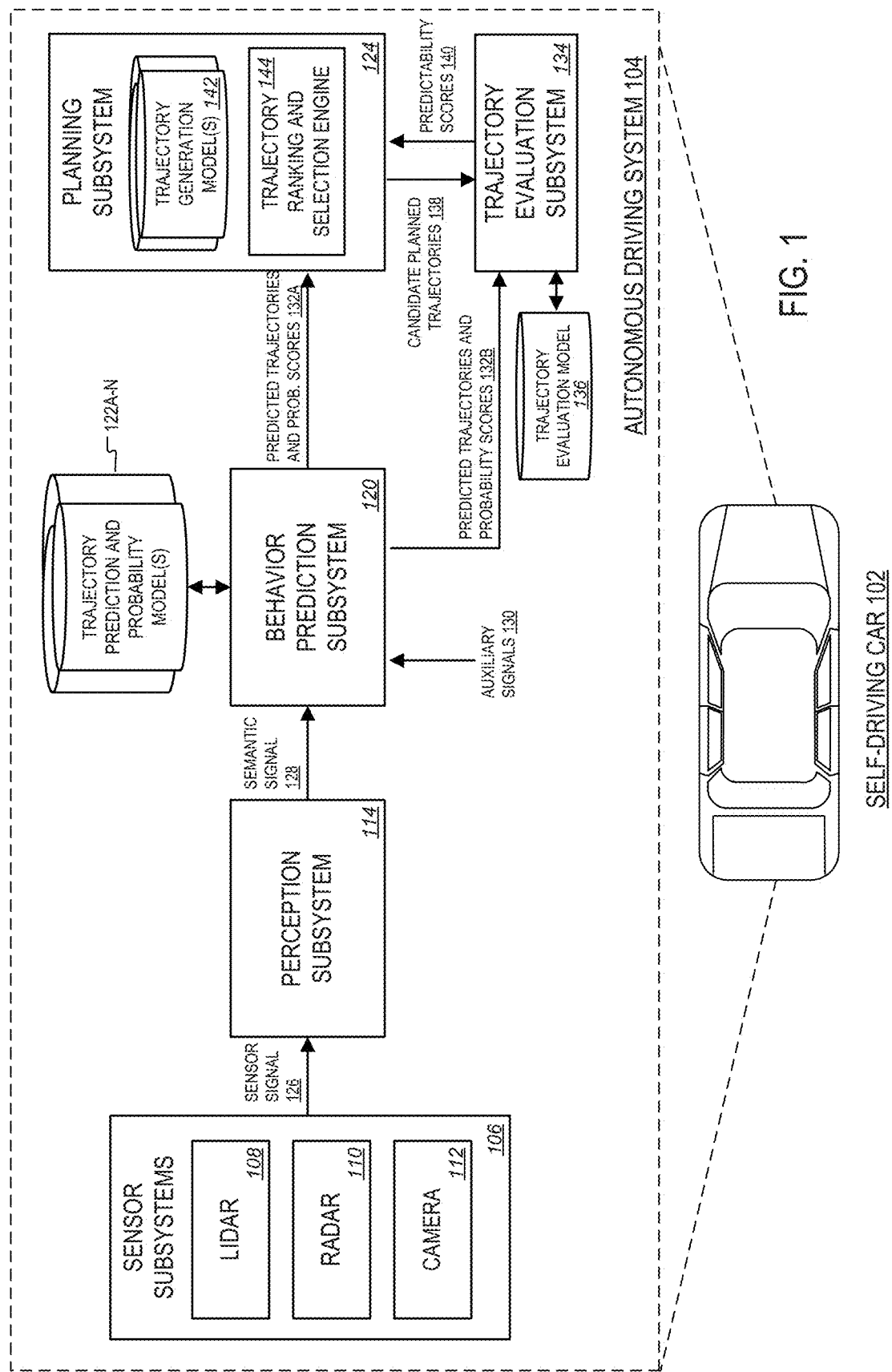
FIG. 1 is a block diagram of an on-board autonomous driving system for a self-driving car.

FIG. 1 depicts a block diagram of an on-board autonomous driving system 104 for a self-driving car 102. The self-driving car 102 is an automotive vehicle configured for operation in one or more settings such as public or private roadways. The self-driving car 102 includes autonomous driving capabilities, and can be fully autonomous (or substantially fully autonomous) such that the car 102 can perform most or all driving tasks for typical trips without a human operator or without human operation. In some implementations, the self-driving car 102 is a two-door or four-door sedan. However, any suitable vehicle can be adapted to include autonomous driving capabilities including sedans, small trucks, large trucks (e.g., lorries), mini vans, large vans, motorcycles, golf carts, station wagons, or sport utility vehicles (SUVs). In some implementations, rather than a self-driving car 102, the autonomous vehicle can be a water-based or aerial vehicle (e.g., boats or planes) configured to navigate and operate autonomously without human input. Further, autonomous vehicle (e.g., self-driving car 102) can be a physical vehicle that exists in the real world, or can be a virtual vehicle that operates in a virtual environment such as for simulation purposes.

The autonomous driving system 104 generally encompasses a full complement of sensors and computing systems that enable autonomous driving capabilities on the self-driving car 102. The system 104 can include one or more sensor subsystems 106, a perception subsystem 114, a behavior prediction subsystem 120 (with associated behavior prediction models 122*a-n*), a planning subsystem 124, and a trajectory evaluation subsystem 134 (with associated trajectory evaluation model 136). Subsystems 106, 114, 120, 124, and 134 can be implemented on one or more computers on the self-driving car 102, and can include various types of memories and data processing apparatus (e.g., CPUs, GPUs, ASICs, FPGAs, micro-controllers). The system 104 should include sufficient computing resources to enable (near) real-time monitoring of the environment surrounding the self-driving car 102, and (near) real-time processing of information about the environment such that driving decisions can be made in sufficient time to account for and react to live/changing conditions in the environment that affect the trajectory the self-driving car 102.

Sensor subsystems 106 can include one or more sensors configured to sense and acquire observations of the environment of the self-driving car 102. The sensor subsystems 106 allow the self-driving car 102 to "see" the environment in the vicinity of the vehicle 102. Some sensors are configured to emit and detect reflections of electromagnetic radiation from the environment in the vicinity of the vehicle 102. For example, sensor subsystems 106 can include one or more laser sensors 108 (e.g., LIDAR laser sensors) configured to detect reflections of laser light. As another example, sensor subsystems 106 can include one or more radar sensors 110 configured to detect reflections of radio waves. As another example, sensor subsystems 106 can include one or more camera sensors 112 configured to detect reflections of visible light.

The sensor subsystems 106 can continually (e.g., at each of multiple time points) capture raw sensor data indicating the directions, intensities, and distances travelled by reflected radiation. For example, a LIDAR or radar sensor can transmit one or more pulses of electromagnetic radiation in a particular direction and can measure the intensity of any reflections as well as the time that the reflection was received. A distance can be computed by determining the time elapsed between transmitting a pulse and receiving its reflection. Each sensor can continually sweep a particular space in angle, azimuth, or both. Sweeping in azimuth, for example, can allow a sensor to detect multiple objects along the same line of sight. Cameras 112 can also continually capture images showing views of the environment surrounding self-driving car 102.

The sensor subsystems 106 can also continually (e.g., at each of multiple time points) generate and output a new sensor signal 126. The sensor signal 126 can include observations of the environment captured by all or some of the sensors in the sensor subsystems 106. In some implementations, sensor signal 126 contains raw sensor data such as the distances measured to objects based on reflected laser or radio waves, or images captured by cameras 112. In some implementations, the sensor subsystems 106 are configured to project the raw sensor data into a two-dimensional view (e.g., a projected image) that shows LIDAR and/or laser results in a top-down view of the environment surrounding the self-driving car 102 (typically the self-driving car 102 is located at the center of the projected image). The sensor signal 126 can include multiple channels such as a first channel depicting a projected LIDAR image, a second channel depicting a projected radar image, and a third channel depicting an image captured by camera 112.

Perception subsystem 114 is configured to process one or more sensor signals 126 and, based on the sensor signals 126, to detect (e.g., road agents) located in a vicinity of the self-driving car 102. For example, the perception subsystem 114 can analyze projected LIDAR images, projected radar images, and/or camera images contained in sensor signal 126 to identify other vehicles driving adjacent or nearby the self-driving car 102. Pedestrians, cyclists, and other objects can be similarly detected, e.g., using suitable object detection and image recognition algorithms. In some implementations, perception subsystem 114 is programmed to generate bounding boxes that identify the outer bounds of a detected object in the environment with a simple geometric shape (e.g., a rectangle, circle, or oval). Perception subsystem 114 can also include memory for storing sensor signals 126 from recent/past time steps, and information about objects detected at recent/past time steps. In this way, the perception subsystem 114 may track objects in the vicinity of the self-driving car 102 over a period of time.

Perception subsystem 114 can further generate semantic signals 128 for agents in the vicinity of the self-driving car 102. Semantic signals 128 generally indicate present and/or past information about detected agents at a higher level of abstraction than the information described in sensor signal 126. For example, a semantic signal 128 can indicate an object type (e.g., classification) for a detected agent (e.g., vehicle, pedestrian, cyclist), and optionally, a sub-type (e.g., sub-classification) for the detected agent, such as whether a vehicle is a truck, sedan, or minivan; whether the pedestrian is a child; whether the cyclist is a child. Semantic signal 128 can include a motion signal that describes information about the position and/or motion of an agent at the present point in time, at one or more preceding points in time, or both. The motion signal, for instance, can indicate an absolute or relative spatial position of the agent, a speed/velocity of the agent, a level of acceleration or deceleration of the agent, a heading of the agent (e.g., a direction that the agent is facing/oriented toward or a direction that the agent is traveling), or a combination of all or some of these. Other semantic signals are also possible that describe current and/or recently detected behaviors of an agent, such as whether the agent recently crossed a street or made a turn.

In order to safely and effectively operate self-driving car 102, the autonomous driving system 104 can benefit not just from information about past and present behaviors of agents in the environment, but also from information about predicted behaviors that the agents are likely to perform in the future. For instance, if another vehicle traveling behind the self-driving car 102 is about to pass on the left, then the self-driving car 102 might avoid moving to the left lane for the time being. To that end, system 104 can include a behavior prediction subsystem 120 to predict behaviors of agents detected in the environment around the self-driving car 102. The predicted behaviors can be determined based on various signals including semantic signal 128 and auxiliary signals 130. The auxiliary signals 130 can include additional detected information, pre-defined information, or both, about the environment of the self-driving car 102, such as road graphs and speed limit information.

Specifically, behavior prediction system 120 processes semantic signal 128 and auxiliary signals 130 to generate a predicted trajectories and probability scores signal 132A. This signal can indicate various information about possible (candidate) actions that might be taken by one or more agents in the vicinity of the self-driving car 102. In some implementations, for each candidate action predicted to be performed by an agent, signal 132A describes one or more candidate trajectories for the agent to travel consistent with the candidate action, and respective probability scores that indicate predicted likelihoods the agent will travel along each candidate trajectory. For example, a vehicle that approaches an intersection may have an option to continue driving straight or to make a right turn from the lane the vehicle is currently traveling in. A first action can be defined for the option of continuing to drive straight on the current road. A second action can be defined for the option of making a right turn. However, each action can be associated with, perhaps, several candidate trajectories (e.g., the right turn may be made onto either of two lanes on the new roadway, or continuing to drive straight might involve maintaining the vehicle's current speed, or might involve yielding to other traffic merging onto the lane). Trajectories can be defined in any suitable form, including polynomials or other analytic functions of vehicle location as a function of time, images that describe the path of movement associated with the trajectory, or occupancy grids that indicate the predicted location of the agent at each of a series of evenly distributed time points for the candidate trajectory.

The behavior prediction subsystem 120 can continually update predicted behaviors for agents in the vicinity of self-driving car 120 as new signals are received describing the latest state of the environment. The behavior prediction subsystem 120 can be configured to process in parallel and/or serially (e.g., in rapid succession) inputs to derive behavior predictions for many agents in the vicinity of the self-driving car 102. Additionally, the behavior prediction subsystem 120 can be configured to assess multiple candidate actions for all or some of the agents. In some implementations, different behavior prediction models 122a-n are defined for different actions and/or different types of agents. For instance, a first model 122a can be provided that predicts behaviors for vehicles coming to a stop, while a second model 122b can be provided that predicts behaviors for pedestrians jaywalking across a street. Models 122a-n can take any suitable form such as linear regression models, support vector machines, random decision forests, neural networks, or a combination of these. Due to the number of predictions that may need to be made by the behavior prediction subsystem 120 in a short amount of time, the models 122a-n can be developed to promote efficient computation of predictions.

Planning subsystem 124 is configured to receive signal 132A from the behavior prediction subsystem 120, as well as other inputs (e.g., road graphs, navigation route information), and to generate candidate planned trajectories for the self-driving car 102. For example, the planning subsystem 124 can determine one or more actions that the self-driving car 102 should perform based on current and predicted information about the environment, and can plot candidate trajectories for the self-driving car 102 consistent with the determined action(s). The trajectory can be derived with the object of maintaining safe distance from other agents in the environment, providing a safe and comfortable ride experience for any passengers in the self-driving car 102, and to comply with applicable traffic laws and regulations. A control system (not shown) can then process a planned trajectory to generate signals that actuate steering, braking, and/or acceleration of the self-driving car 102, thereby causing the self-driving car 102 to initiate travel along the planned trajectory.

Planning subsystem 124 can include one or more trajectory generation models 144 and a trajectory ranking and selection engine 144. Trajectory generation models 142 can include machine-learning models (e.g., deep neural networks, regression models, support vector machines, transformer networks) configured to be executed to generate the candidate planned trajectories for the self-driving car 102. To select a best of the candidate planned trajectories, the trajectory ranking and selection engine 144 can apply various decision criteria to determine which of the planned trajectories should be implemented. The selected trajectory can then be provided to the control system and used to instruct actual movements of the self-driving car 102. As described in further detail with respect to FIGS. 2-6, one criterion for selection of a candidate planned trajectory is the "predictability" of the trajectory. The predictability of a trajectory is one measure of how likely the trajectory would be performed by other drivers or vehicles faced with a similar environment and setting as the self-driving car 102. The safety, efficacy, and comfort of the self-driving car 102 tends to increase when it drives in a predictable manner that other drivers and passengers would expect of the self-driving car 102, e.g., by avoiding confusion that could arise if the car 102 adopted an unusual maneuver that other drivers would not typically perform. To perform predictability assessments, the candidate planned trajectories 138 can be provided from the planning subsystem 124 to the trajectory evaluation subsystem 134. Trajectory evaluation subsystem 134 processes the candidate planned trajectories 138 along with predicted trajectories and probability scores 132B for the self-driving car 102, and returns a set of predictability scores 140 for the candidate planned trajectories 138 to the planning subsystem 124.

Figure 2:
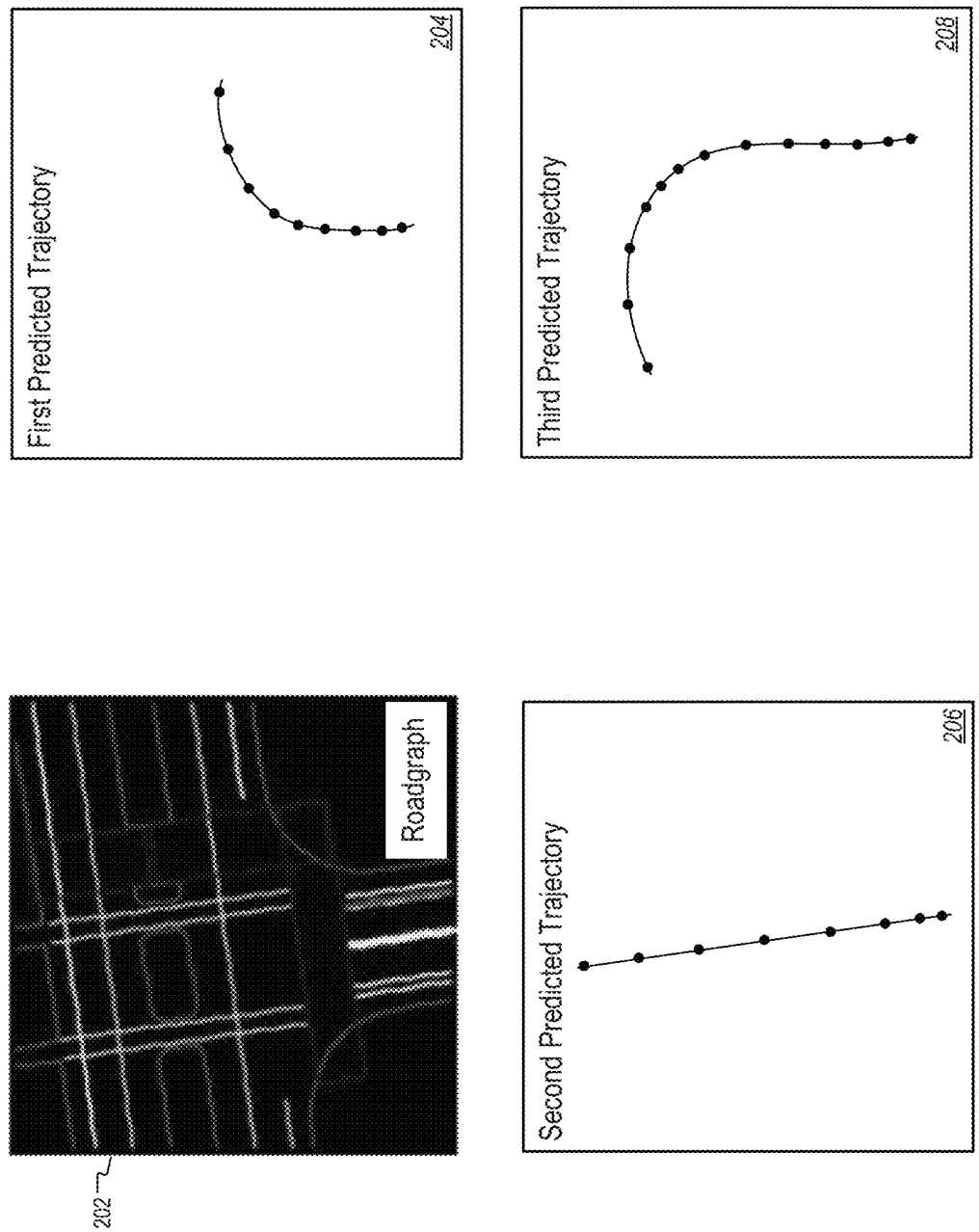
FIG. 2 depicts an example roadgraph for an intersection approached by a self-driving car, along with three predicted trajectories for the self-driving car to pass through the intersection.

FIG. 2 depicts an example roadgraph 202 for an intersection approached by a self-driving car, along with three examples of predicted trajectories 204, 206, 208 for the self-driving car to pass through the intersection. A roadgraph can identify, among other things, the contours of lane boundaries in the vicinity of a self-driving car. For instance, the example roadgraph 202 illustrated in FIG. 2 shows the left and right boundaries of each driving lane, as well as other road features such as the locations of cross-walks at the borders of the intersection. Other information such as bike lanes, medians, construction zones, and the like can also be shown in the roadgraph 202.

For instance, consider a scenario where a self-driving car heads north and approaches the intersection shown in roadgraph 202 in the right lane from the area shown at the bottom of the map. Trajectories can be predicted for the self-driving car based on different possible actions that the car might take at the intersection. For example, the car might take a right turn onto the intersecting road, might continue straight through the intersection on the same road, or might turn left onto the intersecting road. Boxes 204, 206, and 208 illustrate respective predicted trajectories for each of these actions (i.e., right turn, continue straight, left turn). As shown, the predicted trajectories 204, 206, 208 each describe a predicted path for the self-driving car over an upcoming period of time (e.g., the next 0.1, 0.5, 1, 2, 5, or 10 seconds from a current point in time).

In general, predicted trajectories (as well as planned trajectories) indicate future paths for a self-driving car. The paths can be expressed in any suitable form. In some implementations, trajectories are defined by analytic functions (e.g., Legrende polynomials) that describe a continuous path of the car through the environment as a function of time. In some implementations, trajectories are defined by discrete waypoints. In particular, the system can predict or plan a series of waypoints that indicate predicted or planned locations of the self-driving car at each of a series of time steps (typically with equal intervals of time between them). When the car moves at a slower speed, adjacent waypoints will tend to be closer together. When the car moves at a higher speed, adjacent waypoints will tend to be farther apart.

As discussed above with respect to FIG. 1, predicted trajectories can have a lower resolution and can be expressed in a different form than planned trajectories. For example, a predicted trajectory may be expressed as a Legendre polynomial, while a planned trajectory may be expressed as a higher-order polynomial or as a series of waypoints at closely spaced time steps. In some implementations, a set of predicted trajectories includes one or more trajectories for each of multiple possible actions that self-driving car may perform (e.g., a left turn, right turn, or lane change).

Figure 3:
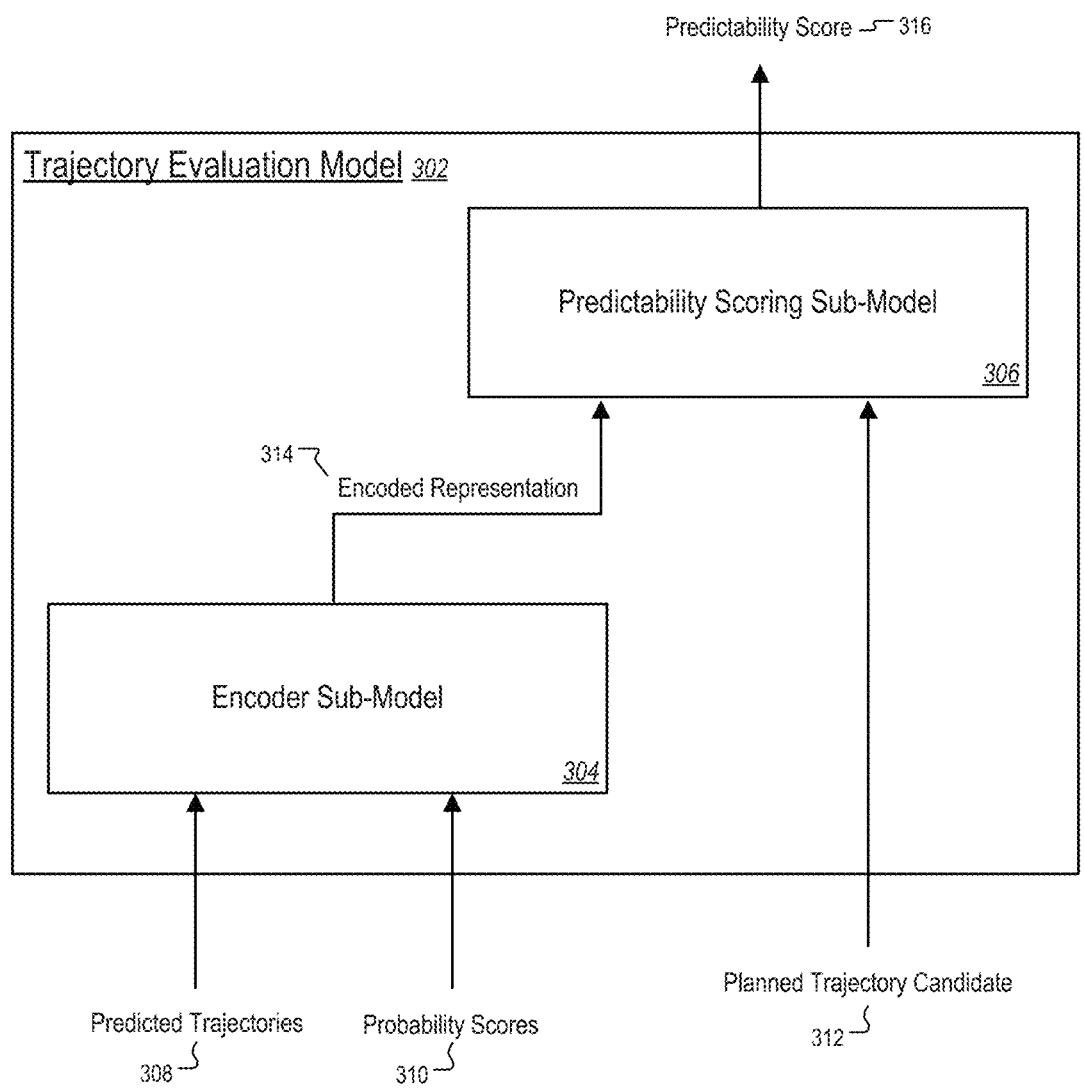
FIG. 3 is a block diagram of an example trajectory evaluation model.

FIG. 3 is a block diagram of an example trajectory evaluation model 302. Trajectory evaluation model 302 is configured to generate a score 316 quantifying the probability of occurrence (e.g., predictability) of a candidate planned trajectory for an autonomous vehicle. A computing system onboard an autonomous vehicle (e.g., trajectory evaluation subsystem 134) can execute the trajectory evaluation model 302 in software, hardware, or both, to cause model 302 to accept a set of inputs (e.g., 308, 310, and 312) and to output a predictability score 316.

Trajectory evaluation model 302 includes a pair of sub-models 304, 306. Encoder sub-model 304 forms the first stage of model 302. Encoder sub-model 304 is configured to process inputs representing a set of predicted trajectories 308 and probability scores 310 to generate an encoded representation 314 of the predicted trajectories. As previously described with respect to FIG. 1, probability score 310 indicates respective likelihoods of occurrence of each predicted trajectory in the set of predicted trajectories for the autonomous vehicle. The encoded representation 314 of inputs 308, 310 can be an embedding or other data structure that represents the predicted trajectories 308 and probability scores 310. In some implementations, encoder-sub model 304 is configured to process a variable number of predicted trajectories 308 and corresponding probability scores 310. In some implementations, the size of encoded representation 314 is fixed and does not change as a function of the number of predicted trajectories 308 or probability scores 310. By providing a fixed size intermediate output, the system enables predictability scoring sub-model 306 to process a representation of trajectories 308 and probability scores 310 in an expected or defined format regardless of how many predicted trajectories and probability scores were initially provided to the trajectory evaluation model 302.

In some examples, encoder sub-model 304 can be implemented as a recurrent neural network. In some examples, encoder sub-model 304 can be implemented as a long short-term neural network (LSTM). In some examples, encoder sub-model 304 can be implemented as a deep set. Deep sets are described in the paper titled "Deep Sets" by Zaheer et al., which is hereby incorporated by reference in its entirety.

It is noted that the inputs to encoder sub-model 304 do not necessarily require probability scores 310. If a probability distribution is assumed or implied by default, encoder-sub model 304 can process inputs representing the set of predicted trajectories 308 without a corresponding set of probability scores 310. Moreover, the inputs to encoder sub-model 304 are not necessarily limited to just the set of predicted trajectories 308 and probability scores 310. In some implementations, additional signals/data can be processed by the encoder sub-model 304 to affect the computation of encoded representation 314 (if the additional signals/data were also used in training model 302) and supplement the determination of the predictability score 316 for a planned trajectory. For example, the encoder sub-model 304 may be configured to additionally process data signals representing one or more maps of the environment (e.g., lane lines, road signs, traffic signal states, speed limits), data signals describing a current and/or recent state of the environment (e.g., current and historical information about cars, cyclists, pedestrians, construction zones), or a combination of these. The additional signal can be processed by the same encoder sub-model 304, one or more additional but separate encoder sub-models whose outputs (e.g., additional encoded representation(s)) also feed into the predictability scoring sub-model 306, or can be processed directly by the predictability scoring sub-model 306.

The predicted trajectories 308 can be represented in any suitable format. In some implementations, the predicted trajectories 308 are represented as Legendre polynomials. The inputs to encoder sub-model 304 can thus include vectors that contain the coefficients for a polynomial that represents the shape of a respective one of the predicted trajectories 308.

Once the encoded representation 314 of inputs 308, 310 has been generated, the predictability score 316 can be determined by feeding the encoded representation 314 as a first input to the predictability scoring sub-model 306, and the data representing the candidate planned trajectory 312 as a second input to the predictability scoring sub-model 306. The predictability scoring sub-model 306 processes both of these inputs 312, 314 and, as a result, outputs predictability score 316. The predictability score 316 indicates a probability (i.e., a likelihood) of occurrence of the candidate planned trajectory 312. In some implementations, a higher predictability score 316 indicates that the planned trajectory 312 is more predictable, and a lower predictability score 316 indicates that the planned trajectory 312 is less predictable. For example, the score can fall in the range [0, 1], where '0' indicates a highly unpredictable trajectory and '1' indicates a highly predictable trajectory. In other implementations, a higher predictability score 316 indicates that the planned trajectory 312 is less predictable, and lower predictability score 316 indicates that the planned trajectory 312 is more predictable.

Although both the encoder sub-model 304 and predictability scoring sub-model 306 can be machine-learning models, the types or architectures of the two sub-models 304, 306 can differ. For example, the predictability scoring sub-model 306 can be a feedforward neural network having fully connected layers. By contrast, the encoder sub-model can, for example, be a deep set or a recurrent neural network. Nonetheless, in some implementations, the encoder sub-model 304 and predictability scoring sub-model 306 can be trained together in an end-to-end process. Further detail on training a trajectory evaluation model is described with respect to FIG. 6.

Figure 4:
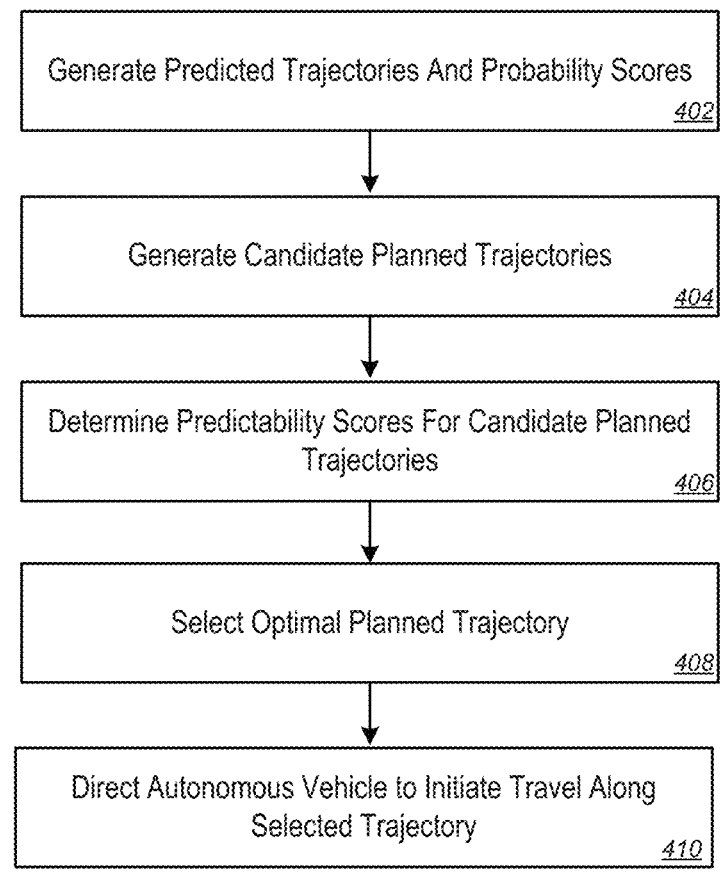
FIG. 4 is a flowchart of an example process for selecting a planned trajectory for a self-driving car based on respective levels of predictability for a set of candidate planned trajectories.

FIG. 4 is a flowchart of an example process 400 for selecting an optimal planned trajectory for a self-driving car based on respective levels of predictability for a set of candidate planned trajectories. As used herein, an "optimal" trajectory does not necessarily refer to the optimal or best trajectory in an absolute sense. Rather, a particular trajectory from a set of candidate planned trajectories that best satisfies one or more criteria including a predictability criterion can be selected and deemed the most "optimal" trajectory among the various candidates. The process 400 can be carried out by one or more computers in one or more locations. In some implementations, the process 400 is performed by an autonomous driving system onboard an autonomous vehicle (e.g., a self-driving car).

The process 400 of trajectory evaluation involves obtaining a set of one or more predicted trajectories for the autonomous vehicle, and probability scores that indicate the predicted probabilities of occurrence of each predicted trajectory (402). In some implementations, predicted trajectories are generated by a behavior prediction subsystem executing one or more trajectory prediction and probability models. Unlike "planned" trajectories, the "predicted" trajectories represent predictions of the autonomous vehicle's movements over an upcoming period of time from a current starting point in time. However, the predicted trajectories are not directly used as a blueprint for controlling vehicle movements. The system can instead generate predicted trajectories for other purposes. For example, the behavior prediction subsystem can track other agents in the vicinity of the autonomous vehicle (e.g., pedestrians, cyclists, other vehicles). The behavior prediction subsystem can use available information about the environment and the agents' current and recent movements to predict trajectories for all or some of the agents detected nearby the autonomous vehicle. These predictions can then be used by a planning subsystem to plan trajectories for the autonomous vehicle that do not interfere with the current or predicted movements of the nearby agents. In some implementations, the accuracy of predicted trajectories for nearby agents is improved by accounting for predicted movements of the autonomous vehicle. For example, the behavior prediction subsystem may be less likely to predict that a pedestrian will cross a street if the autonomous vehicle is predicted to be driving across the pedestrian's crossway at the same time. To that end, the behavior prediction subsystem can predict trajectories of the autonomous vehicle itself so that other processes can make use of the predicted trajectories, e.g., for predicting trajectories of nearby agents in a manner that accounts for the autonomous vehicle's likely movements, and for evaluating planner trajectories according to the techniques described herein.

The models used for generating predicted trajectories for the autonomous vehicle can be designed so as to be relatively inexpensive to evaluate computationally. Since the behavior prediction subsystem predicts behaviors for potentially many agents, the predictions should not consume undue resources or cause undue delay such that predictions cannot be provided to the planner in sufficient time for new trajectories to be planned responsive to current environmental conditions. For example, a predicted trajectory can be determined by selecting a predicted action (e.g., left turn, right turn, continue straight, stop, yield, change lanes), mapping the action to a roadgraph to identify key points in the action (e.g., an initial lane and a final destination lane for a lane change action), and applying a relatively inexpensive motion algorithm to the determine a path for the action. In some cases, predicted trajectories are determined without use of certain information that would be used in generating planned trajectories (e.g., information about the intended route of the vehicle toward a specific destination or a metric relating the progress of the vehicle along the route). Additional models can be implemented to assign probabilities to predicted trajectories.

A planning subsystem can generate a set of planned trajectories for the autonomous vehicle (404). The planning subsystem can use different models and processes to create planned trajectories than those that the behavior prediction subsystem uses to create predicted trajectories. The candidate planned trajectories are trajectories that the planner proposes for the autonomous vehicle to actually follow. The planned trajectories can be based on a range of variables including the current state of the environment, road information indicated by road graphs, predicted behaviors of nearby agents, information about the vehicle's own operational capabilities and limitations, and information about the navigation route planned for the vehicle. While the navigation route can indicate general navigation directions for navigating to a particular destination (e.g., directions indicating which streets to follow and where to make turns), the planned trajectory can be much more detailed and can precisely define how the vehicle should maneuver in the environment in order to safely and comfortably traverse a roadway. The planner sometimes generates more than one planned trajectory, in which case each trajectory can be a candidate planned trajectory. The different candidate trajectories, for example, can reflect entirely different actions for the vehicle to take (e.g., remain driving in the right lane behind a slower vehicle, or initiate a lane change to pass that vehicle). In other cases, the different candidate planned trajectories can pertain to the same higher-level action but describe somewhat different maneuvers or paths for the vehicle to follow to achieve that action.

Upon obtaining the predicted trajectories, probability scores for the predicted trajectories, and candidate planned trajectories, the system can determine predictability scores for the planned trajectories (406). Additional detail on the determination of predictability scores is provided with respect to FIGS. 3 and 5. Using the predictability scores, the system can select an optimal planned trajectory from among the set of candidate planned trajectories (408). In some implementations, the candidate planned trajectories are ranked based on their respective predictability scores and the highest-ranked (e.g., most predictable) candidate is selected as the optimal planned trajectory. In some implementations, the system generates overall ranking scores for the candidate planned trajectories based on the predictability scores and additional scores or metrics. The candidate with the highest overall ranking score can then be selected as the optimal planned trajectory. The planning subsystem can publish the selected planned trajectory and instruct a control system onboard the vehicle to initiate driving of the vehicle along the selected trajectory (410).

Figure 5:
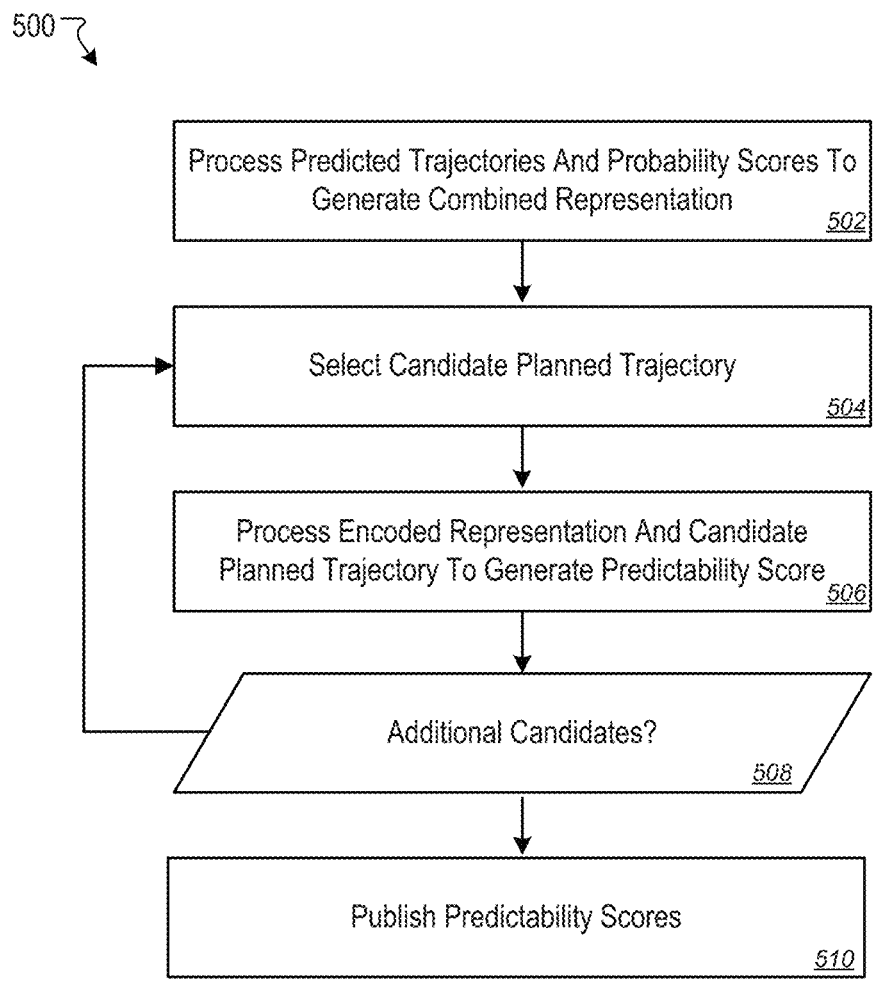
FIG. 5 is a flowchart of an example process for generating a predictability score for a candidate planned trajectory for a self-driving car.

FIG. 5 is a flowchart of an example process 500 for generating a predictability score for a planned trajectory of an autonomous vehicle. The process 500 can be carried out by one or more computers in one or more locations. In some implementations, the process 500 is performed by an autonomous driving system onboard an autonomous vehicle (e.g., a self-driving car). For example, the process 500 can be performed by a trajectory evaluation subsystem executing a trajectory evaluation model trained to generate predictability scores based on a set of inputs.

As described with respect to FIG. 3, the trajectory evaluation model can include an encoder sub-model and a predictability scoring sub-model. The encoder sub-model processes a set of predicted trajectories and probability scores to generate an encoded representation of the predicted trajectories (e.g., an embedding) (502). In some implementations, a plurality of the candidate planned trajectories are provided for evaluation. The system selects a first candidate planned trajectory (504). The predictability scoring sub-model then processes the encoded representation of the predicted trajectories and the selected candidate planned trajectory to determine a predictability score for the selected candidate planned trajectory (506). The predictability score can indicate how predictable the candidate planned trajectory would be in relation to typical behaviors of road users (e.g., as indicated by the set of predicted trajectories). The system checks if additional candidate planned trajectories have been provided for evaluation (508). If there are additional instances to be evaluated, the process 500 can return to stage (504) and select a next candidate planned trajectory to process. Notably, the same encoded representation generated at stage (502) can be used again for each candidate planned trajectory without need to re-compute the encoded representation at each iteration. Once predictability scores have been generated for each candidate planned trajectory, the system can publish the predictability scores to make them available for use by other processes in the autonomous driving system (510). For example, the predictability scores can be provided to a trajectory ranking and selection engine to facilitate selection of an optimal planned trajectory that will be used to control operation of the vehicle.

Figure 6:
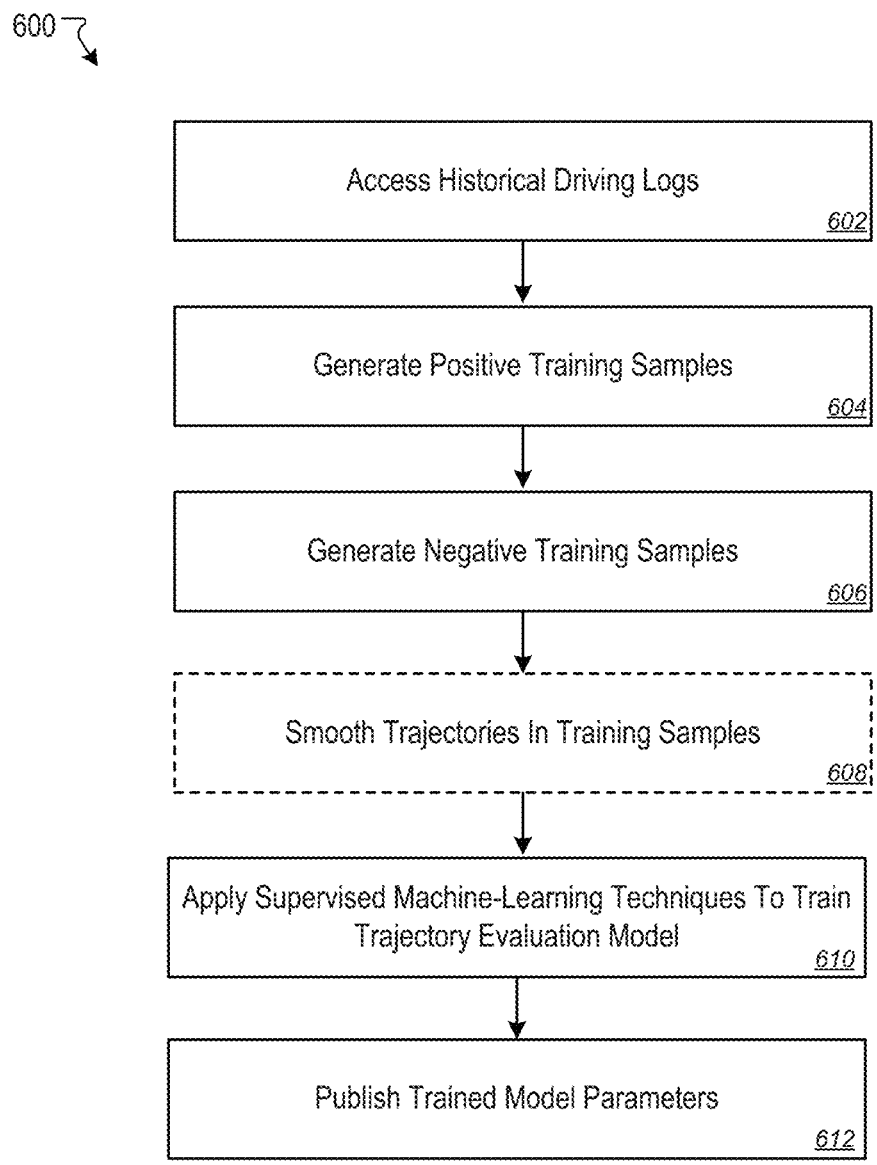
FIG. 6 is a flowchart of an example process for training a trajectory evaluation model using supervised machine-learning techniques.

FIG. 6 is a flowchart of an example end-to-end process 600 for training a trajectory evaluation model using supervised machine-learning techniques. The training process 600 can be performed offline, e.g., not onboard the autonomous vehicle. In some implementations, training is performed by one or more computers in one or more locations, which may or may not include computers onboard the autonomous vehicle. If trained offline, the model's architecture and parameters (e.g., neural network weights) can be downloaded to a computing system onboard the autonomous vehicle at appropriate time(s) (e.g., pre-loaded at the factory, and/or subsequently downloaded and updated after the vehicle has been on the market).

To generate training data, the system can first access logs of driving data describing trips taken by one or more vehicles during past periods of time (602). The logs can reflect trips taken by human-driven vehicles, autonomously driven vehicles, or both. The logs can generally include all of the data that would be available for a behavior prediction subsystem to generate predicted trajectories for a vehicle represented in the logs, probability scores for the predicted trajectories, and planned trajectories for the vehicle. For example, the logs can include sensor data (e.g., sensor signals) acquired by sensor subsystems on an autonomous vehicle, along with other environmental data describing features of the environment through which the vehicle drove (e.g., roadgraph data, speed limit data, heading and motion data for the autonomous vehicle and other road agents, and the like). The logs can also be timestamped to indicate the progression of the vehicle's driving through an environment over time.

Each training sample can be composed of several components including a set of predicted trajectories for a vehicle, probability scores for the predicted trajectories, a candidate trajectory for the vehicle, and a ground truth label. The ground truth label indicates whether the training sample is (i) a positive sample in which the candidate trajectory represented in the training sample is representative of predictable human driving behavior, or (ii) a negative sample in which the candidate trajectory represented in the training sample is not representative of predictable human driving behavior. The training system generates both positive training samples (604) and negative training samples (606). For simplicity, the remaining discussion of FIG. 6 refers to trajectories of an autonomous vehicle, but it is also possible to derive training samples from logged observations of other cars that are not necessarily the autonomous vehicle itself.

For both positive and negative training samples, the set of predicted trajectories and probability scores to be included in the training sample are generated in a substantially similar manner. A point in time for a trip represented in the historical driving logs can be arbitrarily selected as a reference point $t_0$. The training system can then analyze a portion of the driving logs for the trip up to and including time $t_0$, and can generate the set of predicted trajectories and probability scores for the autonomous vehicle in substantially the same manner as would be performed by an onboard autonomous driving system at time $t_0$ (e.g., using a behavior prediction subsystem and trajectory prediction and probability models). In other implementations, the predicted trajectories for an agent that an autonomous vehicle actually generated live during a trip can be recorded in the driving logs, and these trajectories (and corresponding probability scores) can be accessed and applied as the predicted trajectories and probability scores for the training sample.

For positive training samples (604), the candidate trajectory can be determined in a number of ways. The candidate trajectory is the trajectory whose predictability the trajectory evaluation model is to evaluate when the training sample is processed by the trajectory evaluation model. In this sense, the candidate trajectory is the training mode equivalent of the planned trajectory candidate processed by the trajectory evaluation model during the inference phase. If the training sample is derived from logs describing behavior of a vehicle driven by a human (e.g., a non-autonomous vehicle or an autonomous vehicle driven in full or in part by a human), the candidate trajectory can be taken as the trajectory that the autonomous vehicle actually followed from the reference point at time $t_0$ to a later point at time $t_1$ (as indicated in the driving logs). This option has the benefit of reflecting the ground truth reality of the trajectory actually followed, although the logs may contain noisy/jagged trajectories due to sensor inconsistencies. As such, an alternative to using the forward-looking logged trajectories (i.e., after time $t_0$) as the candidate trajectory is to select as the candidate trajectory a predicted trajectory (if the vehicle reflected in the logs is another vehicle such as a non-autonomous agent perceived by an autonomous vehicle) or a candidate planned trajectory (if the vehicle reflected in the logs is a fully or partially human-driven autonomous vehicle that has a planning subsystem) that most closely matches the actually followed trajectory of the vehicle.

For negative training samples (606), the candidate trajectory is a trajectory that the vehicle represented in the driving logs did not follow from the reference point in time $t_0$ to a later point in time (e.g., $t_1$). In some implementations, a predicted trajectory or candidate planned trajectory that was not followed by the vehicle can be used as the candidate trajectory for the training sample. The predicted or planned trajectory may have been recorded directly in the logs, or can be derived using a prediction or planning models based on data from the logs.

Before a candidate trajectory can be used in a negative training sample, the system ensures that the candidate trajectory is sufficiently different from the true logged trajectory that was actually followed by the autonomous vehicle from time $t_0$ to time $t_1$. For example, the training system can determine a measure of similarity (or difference) between the candidate trajectory and the true logged trajectory followed by the autonomous vehicle. If the trajectories are sufficiently dissimilar (e.g., if a measure of difference meets/exceeds a threshold difference score or a measure of similarity does not meet a threshold similarity score), then the candidate trajectory is considered to have not occurred and that candidate trajectory can be used in the negative training sample. Otherwise if the trajectories are not sufficiently dissimilar, a different candidate trajectory (e.g., a different predicted or planned trajectory) that is determined to be sufficiently dissimilar can be selected and applied as the candidate trajectory for the negative training sample. The distance between a candidate trajectory and a true, logged trajectory can be computed using any suitable technique (e.g., a Euclidean inner product, with respect to difference in their costs for cost-based planners, or separately for geometry such as using dynamic time warping and speed).

In practice, one challenge that can occur when candidate trajectories for positive and negative training samples are obtained from different sources (e.g., actually followed trajectories from driving logs for positive samples and predicted or planned trajectories as negative samples) is that the positive samples tend to include noise from perception while the negative samples tend to be noise free or have substantially less noise. Without correction, the trajectory evaluation model may learn to differentiate positive from negative samples based on the level of noise in the inputs rather than the more pertinent signals that are more likely to be seen during runtime (i.e., during the inference phase) onboard a vehicle, such as differences that implicate the predictability or likelihood of occurrence of a candidate trajectory when all planned trajectories that are evaluated are obtained from a motion planner.

In order to mitigate the difference in noise between positive and negative training samples, the candidate trajectories in positive samples (or in both positive and negative samples) can optionally be subjected to smoothing operations (608). In some implementations, smoothing is performed by solving an optimization problem that seeks to both (i) minimize a distance between the pre-smoothing and post-smoothing locations of points in the trajectory and (ii) minimize distances between neighboring points in the smoothed trajectory. For example, the optimization problem can be solved using gradient descent or the Broyden-Fletcher-Goldfarb-Shanno (BFS) algorithm. In some implementations, the system can apply edge-preserving smoothing filters, Kalman filters, or dynamics-aware trajectory estimation which attempts to fit a smooth juke-jerk trajectory around given points.

In some implementations, the training system can use generative adversarial networks (GANs) to produce smoothed trajectories. GANs pre-process and transform the logged and predicted or planned trajectories into a canonical form such that the model (e.g., a neural network) cannot differentiate between the trajectories based only on noise in the perception system. For instance, a GAN can be trained with only the logged and predicted or planned trajectories as input (and labeled as such), with an auxiliary or extra loss function that penalizes large differences between the input trajectory and the GAN-processed trajectory geometrically, in terms of speed, or both. Once the GAN is unable to distinguish between the origins of both types of trajectories, the trajectories can then be merged with other features and fed to the trajectory evaluation model.

With both positive and negative training samples available, the training system can then apply supervised machine-learning techniques to train the trajectory evaluation model (610). In some implementations, the model is trained end-to-end through a process in which samples are processed by both the encoder sub-model and predictability scoring sub-model to generate predictability scores based on the inputs from a given training sample. An error can be measured between predicted predictability scores determined by the model and the ground truth (target) predictability score from a training sample, and parameters in the model can be adjusted using a suitable loss function that is made to reduce error between the predicted values and ground truth (target) values. For example, a cross-entropy loss function can be employed. In some implementations, techniques such as backpropagation with gradient descent are used to update weights or other parameters in the model based on the error. When training is completed, the model can be published and used in appropriate applications such as onboard an actual autonomous vehicle in the real world, or in a virtual autonomous vehicle in a simulated environment (612).

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method for operating an autonomous vehicle, comprising:
    obtaining, from one or more first models, data representing a set of predicted trajectories for the autonomous vehicle and respective prediction probability scores for the set of predicted trajectories, each respective prediction probability score indicating a likelihood that the autonomous vehicle will travel along a different one of the set of predicted trajectories;
    obtaining, from one or more second models, data representing a planned trajectory for the autonomous vehicle, wherein the one or more second models are different than the one or more first models;
    processing, with a trajectory encoding neural network, the data representing the set of predicted trajectories for the autonomous vehicle and the respective prediction probability scores to generate an encoded representation of the set of predicted trajectories;
    processing, with a predictability scoring neural network, the encoded representation of the set of predicted trajectories and the data representing the planned trajectory for the autonomous vehicle to generate a predictability score that indicates a level of predictability of the planned trajectory;
    determining, based at least on the predictability score, whether to initiate travel with the autonomous vehicle along the planned trajectory; and
    in response to determining to initiate travel with the autonomous vehicle along the planned trajectory, directing a control system to maneuver the autonomous vehicle along the planned trajectory.

2. The method of claim 1, wherein the one or more first models comprise one or more behavior prediction models configured to predict movements of agents in an environment of the autonomous vehicle based on a first set of input parameters.

3. The method of claim 2, wherein the one or more second models comprise one or more trajectory planner models configured to plan movements of the autonomous vehicle in the environment based on a second set of input parameters,
    wherein the second set of input parameters includes at least one parameter that is not within the first set of input parameters and that is not used by the behavior prediction models to predict movements of agents in the environment of the autonomous vehicle.

4. The method of claim 2, wherein a resolution of the planned trajectory for the autonomous vehicle is greater than respective resolutions of each of the predicted trajectories in the set of predicted trajectories.

5. The method of claim 1, wherein each predicted trajectory in the set of predicted trajectories represents a different possible trajectory that the autonomous vehicle is predicted to travel, wherein at least two of the predicted trajectories correspond to different actions that the autonomous vehicle is predicted to perform.

6. The method of claim 1, wherein the planned trajectory is a first candidate planned trajectory for the autonomous vehicle;
    further comprising:
        obtaining, from the one or more second models, a plurality of candidate planned trajectories for the autonomous vehicle, wherein the first candidate planned trajectory is among the plurality of candidate planned trajectories; and
        determining respective predictability scores for each of the plurality of candidate planned trajectories.

7. The method of claim 6, wherein determining whether to initiate travel with the autonomous vehicle along the planned trajectory comprises:
    ranking the plurality of candidate planned trajectories based at least on the respective predictability scores; and
    determining to maneuver the autonomous vehicle according to a highest-ranked one of the plurality of candidate planned trajectories.

8. The method of claim 1, wherein the trajectory encoding neural network comprises at least one of a deep set model or a recurrent neural network, wherein the trajectory encoding neural network is further configured to process data representing a variable number of predicted trajectories.

9. The method of claim 8, wherein the encoded representation of the set of predicted trajectories has a fixed size regardless of the number of predicted trajectories processed by the trajectory encoding neural network.

10. The method of claim 1, wherein the predictability scoring neural network comprises a feedforward neural network comprising a plurality of fully connected processing layers.

11. The method of claim 1, wherein the trajectory encoding neural network and the predictability scoring neural network are jointly trained.

12. A system, comprising:
    one or more processors; and
    one or more computer-readable media encoded with instructions that, when executed by the one or more processors, cause performance of operations comprising:
        obtaining, from one or more first models, data representing a set of predicted trajectories for an autonomous vehicle and respective prediction probability scores for the set of predicted trajectories, each respective prediction probability score indicating a likelihood that the autonomous vehicle will travel along a different one of the set of predicted trajectories;
        obtaining, from one or more second models, data representing a planned trajectory for the autonomous vehicle, wherein the one or more second models are different than the one or more first models;
        processing, with a trajectory encoding neural network, the data representing the set of predicted trajectories for the autonomous vehicle and the respective prediction probability scores to generate an encoded representation of the set of predicted trajectories;
        processing, with a predictability scoring neural network, the encoded representation of the set of predicted trajectories and the data representing the planned trajectory for the autonomous vehicle to generate a predictability score that indicates a level of predictability of the planned trajectory;

determining, based at least on the predictability score, whether to initiate travel with the autonomous vehicle along the planned trajectory; and in response to determining to initiate travel with the autonomous vehicle along the planned trajectory, directing a control system to maneuver the autonomous vehicle along the planned trajectory.

13. The system of claim 12, wherein the one or more first models comprise one or more behavior prediction models configured to predict movements of agents in an environment of the autonomous vehicle based on a first set of input parameters.

14. The system of claim 13, wherein the one or more second models comprise one or more trajectory planner models configured to plan movements of the autonomous vehicle in the environment based on a second set of input parameters, wherein the second set of input parameters includes at least one parameter that is not within the first set of input parameters and that is not used by the behavior prediction models to predict movements of agents in the environment of the autonomous vehicle.

15. The system of claim 13, wherein a resolution of the planned trajectory for the autonomous vehicle is greater than respective resolutions of each of the predicted trajectories in the set of predicted trajectories.

16. The system of claim 12, wherein each predicted trajectory in the set of predicted trajectories represents a different possible trajectory that the autonomous vehicle is predicted to travel, wherein at least two of the predicted trajectories correspond to different actions that the autonomous vehicle is predicted to perform.

17. One or more non-transitory computer-readable media encoded with instructions that, when executed by one or more processors, cause performance of operations comprising:

obtaining, from one or more first models, data representing a set of predicted trajectories for an autonomous vehicle and respective prediction probability scores for the set of predicted trajectories, each respective prediction probability score indicating a likelihood that the autonomous vehicle will travel along a different one of the set of predicted trajectories;

obtaining, from one or more second models, data representing a planned trajectory for the autonomous vehicle, wherein the one or more second models are different than the one or more first models;

processing, with a trajectory encoding neural network, the data representing the set of predicted trajectories for the autonomous vehicle and the respective prediction probability scores to generate an encoded representation of the set of predicted trajectories;

processing, with a predictability scoring neural network, the encoded representation of the set of predicted trajectories and the data representing the planned trajectory for the autonomous vehicle to generate a predictability score that indicates a level of predictability of the planned trajectory;

determining, based at least on the predictability score, whether to initiate travel with the autonomous vehicle along the planned trajectory; and in response to determining to initiate travel with the autonomous vehicle along the planned trajectory, directing a control system to maneuver the autonomous vehicle along the planned trajectory.

* * * * *